United States Patent [19]
Toyoshima et al.

[11] 3,906,526
[45] Sept. 16, 1975

[54] FLASH AND CAMERA DEVICE

[75] Inventors: Sakae Toyoshima, Hirakata; Yasunori Sawada, Osaka, both of Japan

[73] Assignee: West Electric Company, Ltd., Osaka, Japan

[22] Filed: Oct. 23, 1973

[21] Appl. No.: 408,533

[30] Foreign Application Priority Data
Oct. 26, 1972 Japan.............................. 47-123679

[52] U.S. Cl. ................. 354/149; 354/273; 354/289
[51] Int. Cl.² .................... G03B 15/03; G03B 15/05
[58] Field of Search ............ 95/11 L, 11 R, 11.5 R, 95/64 R, 64 B; 354/21, 47, 126, 127, 128, 139, 145, 149, 273, 289; 352/141

[56] References Cited
UNITED STATES PATENTS

| | | |
|---|---|---|
| 463,123 | 11/1891 | Hetherington ...................... 95/64 R |
| 3,107,593 | 10/1963 | Hausmann et al. ................. 95/11 R |
| 3,159,088 | 12/1964 | Bauer................................... 354/47 |
| 3,171,337 | 3/1965 | Fischer............................. 95/11.5 R |
| 3,266,395 | 8/1966 | Kremp et al. ......................... 354/21 |
| 3,296,947 | 1/1967 | Engelsmann et al................ 354/127 |
| 3,443,498 | 5/1969 | Bihlmaier............................ 95/11 R |
| 3,464,334 | 9/1969 | Witharm et al...................... 354/21 |
| 3,521,539 | 7/1970 | Kunze ............................. 95/11.5 R |

Primary Examiner—Fred L. Braun
Attorney, Agent, or Firm—Stevens, Davis, Miller & Mosher

[57] ABSTRACT

A combination of a flash device and a camera device or a flash and camera device provided with a light limiting mechanism which is interlocked with the ON-OFF operation of an electric power source so that, when the brightness of an object is so low that the flash device is required, a suitable exposure may be attained only by turning "ON" the power source switch of the flash device.

6 Claims, 9 Drawing Figures

FLASH AND CAMERA DEVICE

This invention relates to a flash and camera device which includes as a combination a flash device capable of flashing and a photographic camera device.

Heretofore, when the brightness of an object is so low that flash mode photography is required, first, the power source switch of a flash-device is tuned "ON," then, a f-value corresponding to the distance between the object and the camera is calculated from the guide number of the flash device by the formula f—value = guide number/distance so that the calculated f-value may be set by means of an aperture adjusting ring provided in the lens portion of the camera and, finally, the photographic operation is performed.

However, in order to calculate the f-value required for photography from the guide number and to set the calculated value on the camera by means of the ring every calculating operation, an operator of the camera is required to be skilled in the flash mode photography art and, further, it is possible that the operator may photograph with the previously set f-value in spite of a varied distance; thus, the prior art flash photography technique is inconvenient for those unskilled in the art.

An object of this invention is to eliminate such disadvantages as described above and, in accordance with this invention, there is provided a flash and camera device comprising a flash device, a camera device, an electric power source switch for operating said flash device and a light limiting mechanism having a shutter and an aperture stop for limiting the light quantity incident to the lens system of the camera device, said light limiting mechanism being adapted to be set in an interlocking relation to the ON-OFF operation of said electric source so that the f-value of the light limiting mechanism is kept at an optimal value whereby said flash and camera device can readily decide a suitable exposure in both natural light mode and flash mode.

That is, in accordance with this invention, it is not required to set an aperture adjusting ring every photographic operation as in the prior art, but, instead thereof, it is required only that, in order to automatically select the f-value for either natural light mode photography or flash mode photography, the electric source switch of the flash device is ON-OFF switched. This is a feature of the present invention and is practically very advantageous.

The above and other features and advantages of this invention will be apparent from the following detailed description taken in conjunction with the accompanying drawings, in which.

Figure 1:
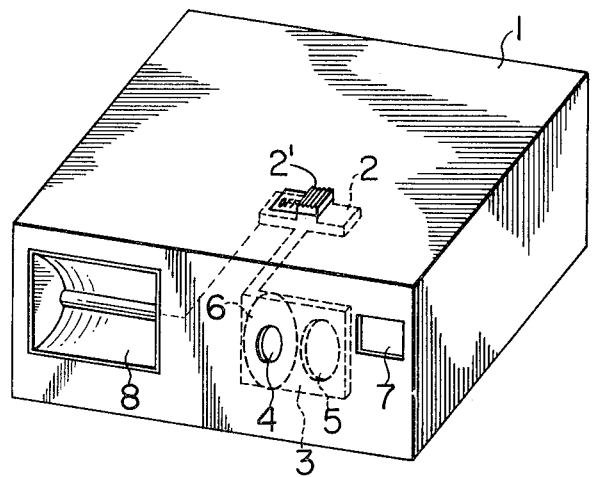
FIGS. 1 and 2 are perspective views of an embodiment of a flash and camera device according to this invention and illustrate steps of the operation.
Figure 2:
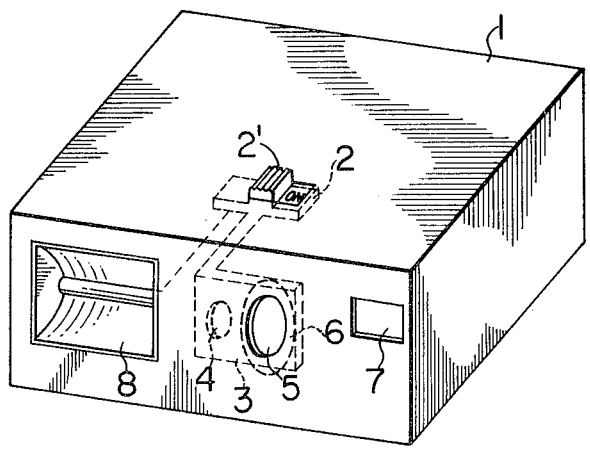
Figure 4:
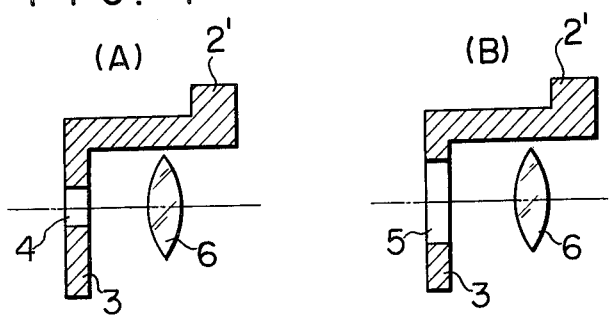
Figure 5:
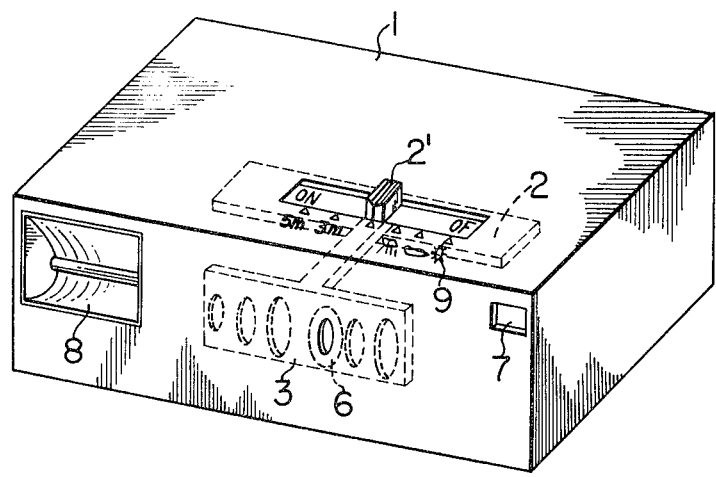
Figure 6:
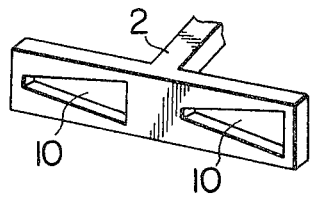
Figure 7:
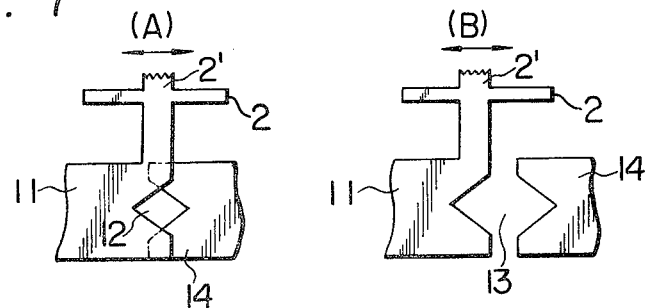

FIGS. 4 (A) and (B) are enlarged cross-sectional views of the essential part of the embodiment in the respective steps as shown in FIGS. 1 and 2;

FIG. 5 is a perspective view of another embodiment of the flash and camera device according to this invention;

FIG. 6 is a perspective view of another aperture change-over means according to this invention; and FIGS. 7 (A) and (B) are, respectively, front views of still another aperture change-over means according to this invention.

Now, this invention will be described in conjunction with the drawings.

Figure 3:
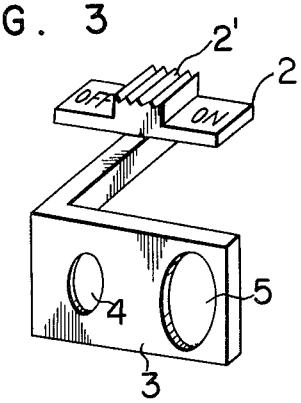
FIG. 3 is a perspective view of an aperture change-over means according to this invention.

FIGS. 1 and 2 show an embodiment of this invention which includes a camera device combined with a flash device. In FIG. 1, numeral 1 is a case which includes a known flash device (not shown) having a flashing element 8. An electric power source switch 2 which is provided within the flash device has a finger piece 2 projecting from the case 1 and a portion having an ON-OFF display thereon representing the ON or OFF state of an electric source. When the OFF signal is displayed on the case 1, the flash device does not operate, while, when the ON signal is displayed, the flash device operates. The electric source switch 2 is, as shown in FIG. 3, integrally formed with an aperture change-over means 3 which is provided with a first aperture 4 and a second aperture 5. The first and second apertures 4 and 5 have areas, respectively, corresponding to the f-values of an aperture stop of a light limiting mechanism which has a shutter (not shown) as well as the aperture stop for limiting the light quantity incident to a lens 6 of the case 1. The aperture change-over means 3 is slidably provided in the vicinity of the lens 6. Numeral 7 is a finder.

The flash and camera device which is so constituted as described above operates as follows. When the brightness of an object is high (when flash mode photography is not required), the electric source switch 2 is set on the OFF position as shown in FIG. 1 thereby to turn OFF the flash device, that is, to cause the flash device not to operate. In this case, the aperture change-over means 3 being in the vicinity of the lens 6 is interlocked with the electric source switch 2 as shown in FIG. 4 (A) so that the first aperture 4 is positioned in front of the lens 6. If, for example, outdoor photography is made using a film of ASA 100 and setting a shutter speed of 1/250 second and a f-value of 11, the first aperture 4 is made to have an area corresponding to the f-value of $f = 11$ whereby a f-value suitable for natural light mode photography is automatically set for the electric source switch 2 being OFF.

Next, when the brightness of the object is low, the electric power source switch 2 is turned ON as shown in FIG. 2, the flash device is connected to start operation and, at the same time, is made to be interlocked with the electric source switch 2. As a result, the aperture change-over means 3 is moved so that the second aperture 5 is positioned in front of the lens 6. If, for example, the guide number of the flash device is assumed to be 16, the f-value corresponding to a distance of 3 m is about 5, 6, that is, two steps of exposure difference from the f-value of $f = 11$ for the above-mentioned natural light mode photography results. Accordingly, it is required in the case of flash mode photography to have an enlarged aperture and, in accordance with the embodiment of this invention, the second aperture 5 is made to have an area corresponding to the f-value of 5, 6. As a result, when the electric source switch 2 is turned ON, the aperture change-over means 3 being interlocked with the source switch 2 moves so as to automatically provide a f-value corresponding to flash mode photography.

FIG. 5 is another embodiment of this invention. In FIG. 5, the aperture change-over means 3 for changing over from flash mode to natural light mode and vice versa is constituted so as to be interlocked with the electric source switch 2 and, more conveniently, a display 9 for displaying distances to an object or weather conditions corresponding to the respective areas of the apertures 5 is provided on the case 1.

In FIG. 6, slits 10 each having a successively varying width is provided thereby to have the same effect as in FIG. 5 in which a plurality of apertures being different in area from each other are separately provided.

Further, the same effect may be achieved by providing a plurality of filters each being of a different color density.

In FIGS. 7 (A) and (B), at least one movable interlocking element 11 being interlocked with the electric source switch 2 is adapted to be moved with respect to a fixed element 14 so that an aperture of variable area such as 12 or 13 may be formed. This embodiment also can have the same effect as in FIG. 5.

What we claim is:

1. Apparatus including a lens for use with photographic film, comprising: a casing; an electronic flash device and a camera device housed in said casing, said flash device including a flash discharge tube for emitting a flash; a power source switch including a finger piece for turning on and off said flash device, said switch and finger piece being slidably connected with respect to said casing and said finger piece being located outside said casing; an aperture change-over means having a plurality of apertures locatable in front of the lens for optimizing the quantity of light transmitted through one of said apertures and the lens onto the film; and means integrally connecting said change-over means and said switch, wherein when said finger piece is slid to turn on said flash device one of said apertures is placed in front of the lens.

2. Apparatus as defined in claim 1, in which said aperture change-over means comprises a change-over plate having said plurality of apertures, said apertures being of respectively different areas.

3. Apparatus as defined in claim 2, in which said casing is provided with display means for displaying distances corresponding to said plurality of apertures of respectively different areas.

4. Apparatus as defined in claim 2, in which said casing is provided with display means for displaying weather conditions corresponding to said plurality of apertures of respectively different areas.

5. Apparatus as defined in claim 1, in which said plurality of apertures comprises a plurality of slits each being of successively varying width.

6. Apparatus as defined in claim 1, in which said aperture change-over means comprises a plurality of plates at least one of which can move with respect to another plate to form said plurality of apertures and to change the area of said apertures.

* * * * *